United States Patent
Keesara

(10) Patent No.: US 8,787,377 B2
(45) Date of Patent: *Jul. 22, 2014

(54) USAGE OF MASKED BMAC ADDRESSES IN A PROVIDER BACKBONE BRIDGED (PBB) NETWORK

(75) Inventor: Srikanth Keesara, Tewksbury, MA (US)

(73) Assignee: Avaya, Inc., Basking Ridge, NJ (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/097,224

(22) Filed: Apr. 29, 2011

(65) Prior Publication Data

US 2012/0243544 A1    Sep. 27, 2012

Related U.S. Application Data

(60) Provisional application No. 61/454,944, filed on Mar. 21, 2011.

(51) Int. Cl.
*H04L 12/28*    (2006.01)

(52) U.S. Cl.
USPC ....... 370/392; 370/389; 370/395.53; 370/401

(58) Field of Classification Search
USPC ............... 370/389, 395.53, 401, 392, 395.5
See application file for complete search history.

(56) References Cited

U.S. PATENT DOCUMENTS

2004/0264458 A1 * 12/2004 Six .................................. 370/389
2010/0316056 A1 * 12/2010 Unbehagen et al. .......... 370/401

* cited by examiner

*Primary Examiner* — Dang Ton
*Assistant Examiner* — Mandish Randhawa
(74) *Attorney, Agent, or Firm* — Anderson Gorecki & Rouille LLP

(57) ABSTRACT

Techniques disclosed herein include features and methods that extend functionality of provider networks including Provider Backbone Bridges (PBB) networks. Techniques include using a portion of information within Ethernet address encapsulation headers for purposes other than identifying source and destination device addresses. The system limits a number of bits in an address header that should be considered by a provider network node when doing an address lookup in forwarding tables of a provider network node, such as by masking the portion of bits or otherwise disregarding that portion of bits during address lookup. The remaining bits in the address field(s) become free bits that can be used for a variety of application purposes, such as flow path selection. By using information fields that already exist in the Mac-In-Mac (MIM) encapsulation header, such Techniques provide additional information without increasing packet size or requiring new protocols.

18 Claims, 10 Drawing Sheets

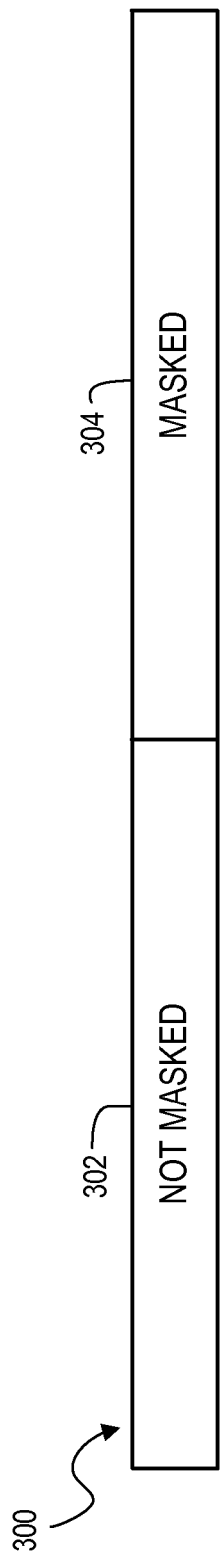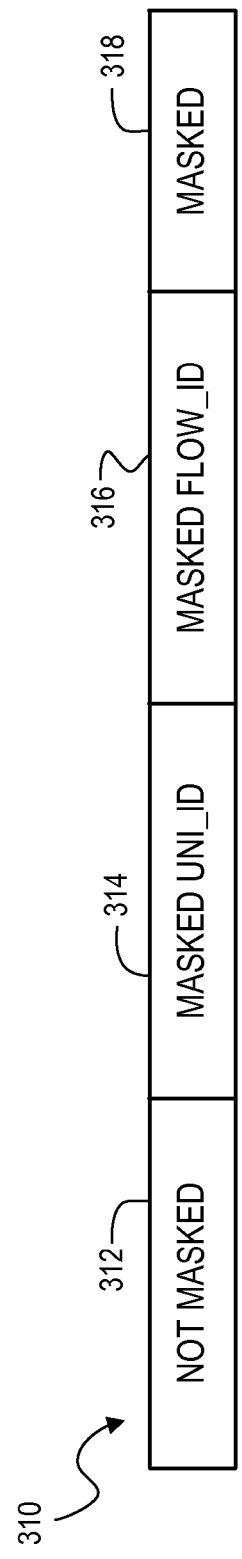

USAGE OF MASKED BMAC ADDRESSES IN A PROVIDER BACKBONE BRIDGED (PBB) NETWORK

CROSS REFERENCE TO RELATED APPLICATIONS

The present application claims the benefit of U.S. Provisional Patent Application No. 61/454,944, filed on Mar. 21, 2011, entitled "Layer 2 Address Modification," which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

Computer networks can include various configurations. One such configuration, known as a virtual private network (VPN), is a network that operates over a public communication network (such as the Internet) to provide remote offices or individual clients with secure, private access to a specific network, such as a network specific to an organization or company. VPNs function by encapsulating data transfers between two or more networked devices that are not on the same private network. Such encapsulation keeps transferred data private from other devices on one or more intervening local area networks or wide area networks. A VPN can enable a group of client computers to communicate and access specific resources as members of a given broadcast domain even if the various member client computers are not attached to the same network switch.

Network services, including VPN services are commonly provided using Ethernet technology. Ethernet has become a default Data Link Layer technology for data transport, that is, the default for Layer 2 (L2) of the Open Systems Interconnection (OSI) model. There are several accompanying technologies and protocols that expand Ethernet technologies to other or larger networks. One such protocol is that of Provider Backbone Bridges (PBB) or IEEE 802.1ah. A network that uses IEEE 802.1ah can route a customer network over a provider's network allowing interconnection of multiple Provider Bridge Networks without losing each customer's individually defined Virtual LANs (VLANs). Another such protocol is that of Shortest Path Bridging or IEEE 802.1aq. A network that uses IEEE 802.1aq can advertise both topology and logical network membership.

Packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

SUMMARY

One challenge with provider networks, such as Provider Backbone Bridges (PBB) or other networks that use Mac-In-Mac encapsulation technology, is extending routing and switching functionality. Such provider networks encapsulate Ethernet packets (that already have at least one Ethernet encapsulation) before routing such packets across the provider network. Such encapsulation is typically executed at a first edge node of the provider network, transported via core nodes using the encapsulation header information, and then decapsulated at a second edge node before continuing to a customer network.

Ethernet encapsulation, by the provider network, simplifies and accelerates data transport across the provider network, but this can be at the expense of reduced routing functionality. For example, if an administrator wanted to add additional features within the provider network, then the administrator would have to configure the provider network so that each node looks deeper within a given packet (examines headers within the encapsulation header). Such additional features can include supporting Equal-cost multi-path routing (ECMP), identifying specific User-Network Interfaces, providing Time to live (TTL) information, identifying flow paths, or any extra information or metadata. Having each node execute such deep packet inspection, however, slows down traffic within the provider network, which can cause delays and lost packets. Alternatively, a new routing protocol could be introduced, but a new protocol would require substantial hardware and software updates across all nodes within a provider network, which can be time and cost prohibitive.

Techniques disclosed herein include features and methods that extend functionality of provider networks. Techniques include masking a portion of information within Ethernet address headers. By using an address mask for Ethernet MAC addresses in a provider network, the masked bits can be used for purposes other than—or distinct from—addressing. The system limits a number of bits in an address header that should be considered by a provider network node when doing an address lookup in forwarding tables of the provider network node. A subset of address bits is used to identify address information in the provider network. The remaining bits in the address field(s) become free bits that can be used for a variety of application purposes. When executing an address lookup, the free bits can be masked or otherwise ignored for address lookups, but used for additional network management or routing operations.

By using information fields that already exist in the Mac-In-Mac (MIM) encapsulation header, such techniques provide additional information without increasing packet size. Freed bits in the address fields are not considered address information. Accordingly, the use of these free bits for other purposes does not result in an increase in the number of addresses that need to be stored in forwarding tables. Moreover, Connectivity Fault Management (CFM) is not compromised, because the selection of forwarding paths by core nodes is still only limited to the VLAN ID and device address fields.

One embodiment includes an address manager that executes a packet switching process. The address manager receives a data packet at a first data switching device, such as an edge node of a provider network. The data packet has an existing header and is received from a customer network. The address manager encapsulates the data packet using an Ethernet header. The Ethernet header has a data structure that includes at least a provider device address space and a virtual local area network (VLAN) indicator space. Encapsulating the data packet includes setting a first portion of bits, within the provider device address space, that indicates a data switching device address that is a node within the provider network. That is, the address manager enters device address information in a subset of the total number of available bits for that device address space. Encapsulating the data packet also includes setting a second portion of bits, within the provider device address space, as bits that indicate information distinct from the data switching device address. In other words, the second portion of bits can be used as metadata or extra information that is used apart from indicating a device address. The first data switching device then forwards the data packet via the provider network.

In another embodiment, using the Ethernet header includes indicating, within a VLAN indicator space of the header, which bits of the provider device address space indicate the data switching device address, and which bits of the provider device address space indicate the information distinct from the data switching device address. Thus, additional information contained within the VLAN space can indicate which bits to mask and which bits to use for an address lookup. In another embodiment, additional information is included within the provider address space to identify a flow path or provide information for flow path computation.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a data packet at a first data switching device, the data packet having an existing header and being received from a customer network, the first data switching device being an edge node of a provider network; encapsulating the data packet using an Ethernet header, the Ethernet header having a data structure that includes a provider device address space and a virtual local area network (VLAN) indicator space; encapsulating the data packet includes setting a first portion of bits, within the provider device address space, that indicates a data switching device address that is a node within the provider network; encapsulating the data packet includes setting a second portion of bits, within the provider device address space, that indicates information distinct from the data switching device address; and forwarding the data packet via the provider network. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting packet switching and routing. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 3A and 3B are diagrams illustrating example divisions within an Ethernet address header, according to embodiments herein.

DETAILED DESCRIPTION

Techniques disclosed herein include systems and methods that extend functionality of provider Ethernet networks. Techniques include adding extra information—distinct from device source and destination addresses—within Ethernet address headers that encapsulate data packets. This extra information within Ethernet Media Access Control (MAC) address spaces is used for purposes separate from device addressing. For example, the extra information can be used for equal-cost multi-path routing (ECMP), identifying specific User-Network Interfaces, providing time to live (TTL) information, identifying flow paths, or for any other data transport management purpose.

Techniques disclosed herein can be used with any network that has a functional difference between a customer/access network and a provider/transport network, and with the provider network using an encapsulation process for transporting data across the provider network. For convenience in describing features and embodiments herein, the following disclosure will primarily describe various embodiments in the context of Provider Backbone Bridges (PBB) technology, though it will be clear to persons skilled in the art how these techniques can be applied to additional and comparable networking technologies, such as Transparent Interconnect of Lots of Links (TRILL) protocol.

Figure 2:
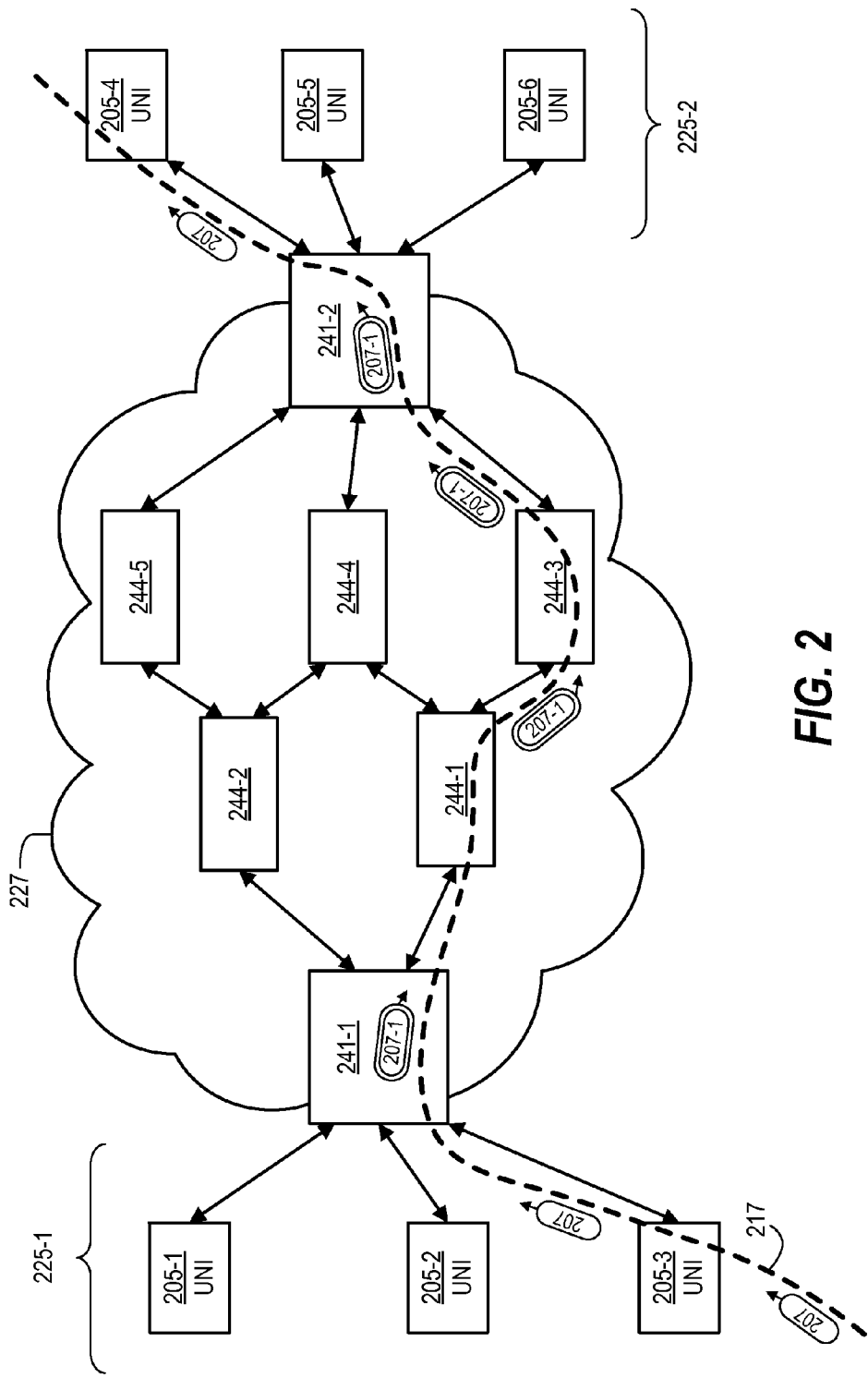
FIG. 2 is a network diagram of a provider network according to embodiments herein.

A PBB network is a L2-Bridged network that uses Mac-In-Mac encapsulation to transfer user L2 traffic between two or more L2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network. Referring to FIG. 2, provider edge nodes 241-1 and 241-2 function as BEBs within provider network 227, while nodes 244-1 through 244-5 function as core nodes or BCBs.

Figure 1:
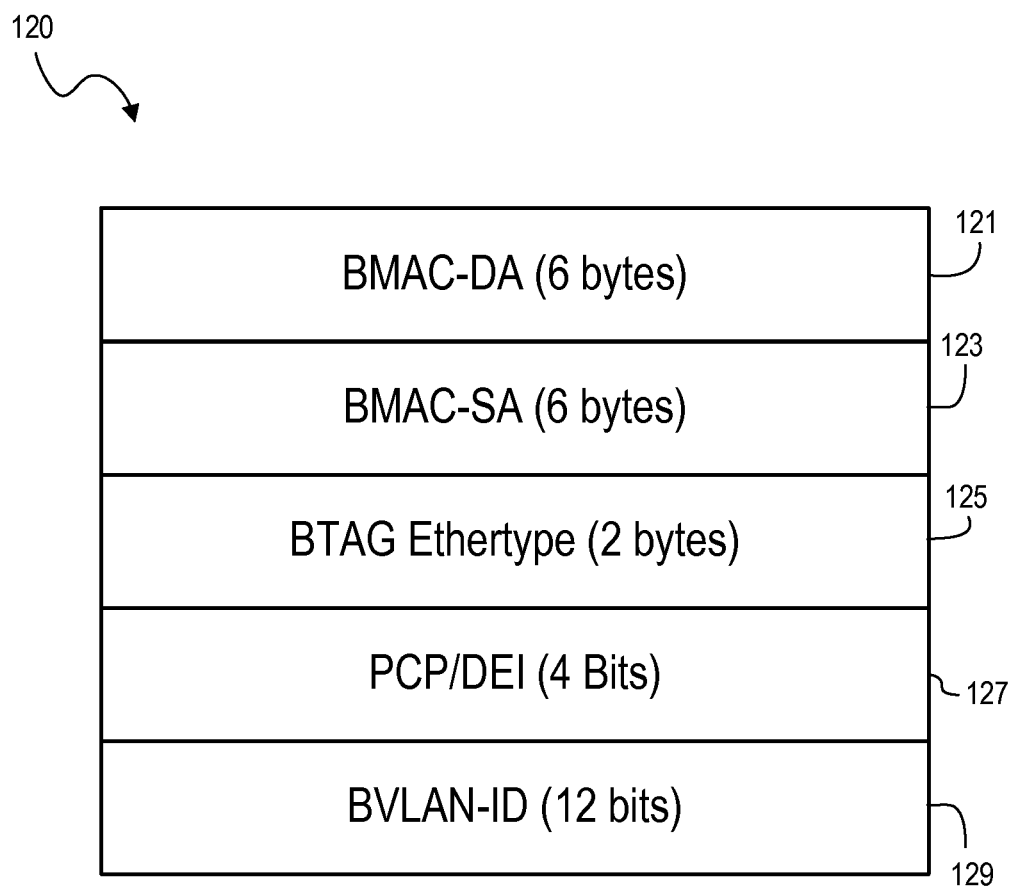
FIG. 1 is a diagram showing a conceptual representation of a data structure of a provider network Ethernet header, according to embodiments herein.

Using Mac-In-Mac encapsulation, a given BEB encapsulates a data packet received from a customer network with an Ethernet header for use in the provider network. FIG. 1 illustrates components of such an example encapsulation header 120. Header 120 shows five header fields. Note that such encapsulation headers can contain additional fields beyond what is shown in FIG. 1. Field 121 is a Backbone MAC destination address header (BMAC-DA). The destination address field contains six bytes (48 bits) of data. Field 123 is a Backbone MAC source address header (BMAC-SA). The source address field contains six bytes (48 bits) of data. Field 125 contains two bytes for a backbone Ethertype Tag. Field 127 contains four bits of data for service information. Field 129 is a Backbone VLAN identifier field (BVLAN-ID) that has 12 bits of data.

When forwarding a packet in a PBB network, a given node executes an address lookup. Currently, address lookups on BMAC-DA and BMAC-SA in the PBB network seek to match all 48 bits of both of these MAC addresses to determine whether or not to forward the packet and also to determine on which outgoing interface to forward the packet. When forwarding a packet between BEBs it is often desirable to be able to include extra information in the packet that can be used by BCBs and/or BEBs that receive the packet as a means for efficient processing.

The BMAC-DA and BMAC-SA in the Mac-In-Mac (MIM) headers are 48-bits each allowing for a full "2 to the power 48" (2 raised to the 48th power) addresses in the PBB network. This is an extremely large number. A large number of addresses is unlikely to be deployed in an actual PBB network. The system herein uses this discovery by limiting the number of bits in the address space/field that should be considered by the BCB when doing a (BVLAN-ID,BMAC-DA) lookup or a (BVLAN-ID,BMAC-SA) lookup in the forwarding table of a BCB or BEB. A smaller subset of the 48-bits of the address space is used to identify device address information in the PBB network, that is, for the intended use of the address field. Any scheme can be used for selecting the size and configuration of the subset. For example, a simple rule using a fixed number like the first 24 bits or the first 20 bits of the address information could be used. Other variations are also possible. There are multiple uses for the remaining bits. The remaining bits are identified as masked bits, that is, bits designated to be masked or ignored during forwarding table lookups. These remaining masked bits in the two address fields (BMAC-SA and BMAC-DA) can then be considered as free bits that can be used for a variety of application purposes.

By using information fields that already exist in the Mac-In-Mac (MIM) encapsulation header, packet size is not increased. Bits within the BMAC-DA and BMAC-SA that have been freed up for application use are not considered address information. Accordingly, use of these free bits for other purposes does not result in an increase in the number of addresses that need to be in the (BVLAN-ID,BMAC) forwarding tables. Moreover Connectivity Fault Management (CFM) (IEEE-802.1ag) is not compromised, because the selection of forwarding paths by BCBs is still only limited to the BVLAN-ID, BMAC-DA and BMAC-SA fields. As far as implementation of such techniques, several conventional silicon and Network Processing Unit (NPU) that do the (BVLAN-ID,BMAC) based forwarding already have the ability to mask a portion of the MAC address while doing a lookup. Embodiments are not limited to a specific number of address bits that should be masked in the (BVLAN-ID,BMAC-DA) and (BVLAN-ID,BMAC-SA) lookups. Instead, embodiments include address bits that are not used in a source or destination device address lookup that are used for other creative and beneficial application uses (such as ECMP).

Various embodiments can determine a number of bits to mask or bits that are distinct from address bits. A large enough (several bits) encoding of the packet "entropy" stored at a fixed location in the packet can used to support ECMP without erroneously ordering user flows. Other embodiments can provide an ability to convey information about the incoming non-PBB network interface on the sender BEB and the outgoing non-PBB network interface of the receiver BEB. Other forms of meta-data that may be of interest to the sender and the receiver BEBs, but should be ignored by the BCBs, can also be included. Such techniques provide extensible functionality with no increase in packet overhead, without requiring a BCB/BEB to support larger (BVLAN-ID,BMAC) based forwarding records, without compromising CFM to effectively test all forwarding paths that might be used by user data frames, and without burdening the BEBs and BCBs with excessive implementation complexity.

One general networking objective is to keep forwarding tables small for better scaling. In a PBB network, or other provider (transport) network that has a hierarchical addressing scheme, the provider network is typically structured as a transport network that connects two a more customer (access) networks. FIG. 2 shows customer networks 225-1 and 225-2. Note that customer network 225-1 includes User-Network Interfaces (UNIs) 205-1, 205-2, and 205-3, while customer network 225-2 includes User-Network Interfaces (UNIs) 205-4, 205-5, and 205-6. Note that the provider transport network can be provided by a single administrator or by multiple administrators. Also note that the provider network and the customer network can also be provided by a single administrator, but are nevertheless functionally treated or identified as separate networks. With such a network configuration (provider network connecting two or more customer networks), the provider network has added or defined an encapsulation layer such as Mac-in-Mac encapsulation. Upon receiving a given frame at the interface between the first access network and the transport network, PBB functionality encapsulates the customer frame within the Mac-in-Mac encapsulation header of the addressing scheme. In FIG. 2, data packet 207 is received at edge node 241-1 from UNI 205-3. Edge node 241-1 encapsulates packet 207 with an Ethernet encapsulation header. The encapsulated packet is now represented as packet 207-1. Edge node 241-1 then forwards packet 207-1 along flow path 217 through provider network 227. Note that flow path 217 can represent an arbitrary flow path or a deterministic flow path depending on packet instructions. Packet 207-1 is next forwarded by core nodes 244-1 and 244-3 before being received a edge node 241-2. Edge node 241-2 then decapsulates packet 207-1 and forwards the original packet 207 within customer network 225-2.

The Mac-in-Mac encapsulation header includes the source address of the customer network 225-1 and the destination address of the second customer network 225-2. Each address is a full 48 bit address. Essentially, Mac-in-Mac functionality adds an addressing layer on top of an existing frame to hide underlying addresses from the network devices within the provider network. Thus, routers and switches within the provider network do not see the underlying addresses of packets when using the PBB protocol. In practice, the number of customer devices can be in the millions or more, thus having to maintain forwarding tables for every customer device at each data switching device within the provider network would significantly increase processing of each provider device and significantly slow forwarding operations because of the numerous lookups required. A PBB, as a solution, creates a hierarchical addressing scheme within the provider network. Provider networks are different from customer networks because provider networks typically have significantly fewer devices. While customer networks can have tens of millions of addresses, large provider networks often have 1000 to 2000 device addresses or less. Mac-in-Mac then uses a different addressing scheme within the provider network as compared to the customer networks. Addresses within the provider network are addresses of devices within provider network 227 itself as opposed to end user device addresses.

The Mac-in-Mac addressing scheme is similar to that of Ethernet in that the source and destination address fields provide 48 bits of data. Conceptually, this means that each address field of the Mac-in-Mac header can identify 2^48 addresses (2 raised to the 48th power). A conventional provider network cannot use that many address, and, indeed, typically uses only several hundred addresses, with extremely large provider networks using one to three thousand addresses. There is no requirement that these provider addresses be globally administered. Accordingly, it is possible to have very flexible administration schemes, including complete freedom in assigning addresses. More specifically, it is possible to have locally administered addresses, as opposed to having to purchase addresses from a regulatory body. For example an administrator would not need to acquire Mac addresses from IEEE or IETF or otherwise purchase Mac addresses. Using locally administered addresses in combination with a relatively small number of provider devices within a given provider network means that the required number of device addresses is several orders of magnitude smaller than the address space potential. By using only a portion of bits of an address space sufficient identify an expected total number of provider device addresses, the remaining bits can be considered as free bits available for many different purposes.

With such locally administered addresses, and with the total number of such addresses typically in the hundreds to a couple thousand, there is a lot of data potential within each address space of the Mac-in-Mac header. In other words, there is a lot of information potential merely to carry about 2000 addresses. Techniques disclosed herein exploit this information potential by providing a masked address format of one or both 48 bit address spaces in the Mac-in-Mac header. Such a technique preserves the Mac-in-Mac addressing structure so that network processing units, hardware, and other components used for address forwarding can still function as-is, without any hardware upgrades.

In one embodiment, the system administers the source and destination address spaces in a Mac-in-Mac header as locally administered. The system then reserves a portion of the address space for locally administered provider devices to indicate the actual devices in the provider network (typically switches and routers). This technique frees up the remaining bits, or bits in the remaining portion not reserved for provider device addresses, to be used for other purposes. Such purposes can include non-address purposes. The system provides remaining bits for other uses without increasing a number of forwarding records maintained at each provider device within the provider network. Without masking or otherwise indicating that the freed up bits are not to be used in the forwarding tables, the forwarding tables would dramatically increase because every time a provider device identifies a new address, that address would need to be added to respective forwarding tables.

In one technique, the system can instruct each provider device to use masked forwarding. The system can execute masking using various techniques. For example, for an address space that contains 48 bits, 20 of those bits might be used for device addressing, while the remaining bits are used for other purposes. In one masking technique, the remaining bits are converted to zeros when executing a given lookup in a forwarding table. Thus, despite various different uses of the remaining bits, the forwarding lookup operation will ignore these remaining bits. This results in fewer variations and combinations of lookup key values, thereby providing or maintaining small forwarding tables.

Note that the selection of bits used for provider device addressing as compared to bits used for other purposes can be selected according to design. For example, a simple scheme designates the top 24 bits for addressing, and the lower 24 bits for other purposes. Alternatively a random or pseudorandom selection of bits can be used for addressing while all the remaining bits are used for other functional purposes. In another example, the available bits can be segmented with each segment used for a different purpose (one segment being used for provider device source/destination addressing). Such a technique provides additional routing and forwarding functionality without defining a new encapsulation protocol and without blowing up the size of forwarding tables. The actual number of bits used for provider device address can depend on the expected number of total devices within the provider network. For example 12 non-masked bits within the address space (including locally administered and unicast designation bits) would provide about 1024 addresses. Too few address bits would limit the number of nodes that can participate in the PBB network, while too many non-masked bits would waste address bits.

When a given provider device within a provider network receives a packet having a modified Mac-in-Mac header (MAC address plus additional data), the given provider device can function by masking a portion of the bits within the address space (such as by zeroing the values) prior to performing an address lookup, while leaving other bits within the address space as is. In other implementations, a forwarding table itself (executing in the forwarding data plane of the provider device) can have masking capabilities so that even if the full 48 bits are passed to the forwarding table, as soon as the forwarding table finds a match on the first 24 bits (or other amount of bits) the forwarding table stops trying to match the surplus bits. In other words, the forwarding table can search for the longest prefix match or longest set of bits in the address space that matches an address in the forwarding table.

Thus, in one case, a given provider device knows or identifies that an address space is using a specific or fixed mask size. In this case the device can apply a mask in advance on the Mac address bits and then do a lookup. In other embodiments, the device may not know the exact size of the mask, and so will then execute a lookup to find the longest sequence of bits that match, and then the remaining bits outside the longest match can be treated as entropy bits or ECMP bits, or bits for other forwarding functionality. In either example, bits in the packet address fields can remain the same and not modified during the forwarding process. This technique can provide additional forwarding functionality (such as flow information) without requiring provider devices to look deeper into packets and without increasing the size of forwarding tables.

Packet flow IDs are also possible with the system. To use flow IDs without techniques disclosed herein, the provider device would need to look deeper into packets and identify user fields and then generate a flow ID and then use that generated flow ID to select a path. This conventional approach undesirably requires a provider device to look deep into packets and also to do protocol specific inspections. By looking deeper into a given packet, the provider device is taking on the responsibility of knowing what each field within an inner header means. Techniques disclosed herein, however, focusing on address information that is uniformly described, and such address information can be perpetually extensible. For example, a solution that requires a new protocol means that each provider device needs to be updated, reconfigured, or otherwise replaced to be able to understand the new protocol. This is not a desirable solution with hundreds of provider devices within a given provider network. With techniques disclosed herein, the system extracts this information into the address field of an existing header. Each core node can then execute masked forwarding, and can use the non-masked bits for hashing and generating flow IDs, without looking deeper into underlying packet headers.

In one embodiment, bits can be masked in a unicast BMAC. In this embodiment, the system uses locally administered unicast BMAC addresses by setting Bit 41 on the BMAC to "one" to indicate that the MAC address is locally administered and then setting Bit 40 of the BMAC is to "zero" to indicate that it is a unicast address. The system then masks a subset of 48-bits of the unicast BMAC for the purpose of address recognition/lookups. The value of the masked bit is ignored for the purpose of determining address matches. Bit 41 (locally administered bit) and Bit 40 (multicast bit) are not masked. FIG. 3A shows an example division of the addressing space 300. Note that portion 302 and portion 304 are approximately equal in size. In address space 300, portion 302 can contain a provider device address and thus remain non-masked, while an equal portion (24 bits) are masked (intended for purposes other than source/destination addressing). This opaque information can be customized for use with any number of applications.

Returning to FIG. 2, all nodes within provider network 227 are assigned BMAC addresses that are unique in the top 8 bits, with the lower 40 bits considered free or masked. Edge node 241-1 encapsulates packet 207-1 by masking the lower 40 bits of a BMAC address. When packet 207-1 arrives at core node 244-1, core node 244-1 recognizes the top eight bits of the BMAC-DA as the address of edge node 241-2, and the lower eight bits of BMAC-SA as the address of edge node 241-1, and then forwards packet 207-1 to edge node 241-2 (via node 244-3). Thus, node 244-1 only needs to know three BMAC addresses in its forwarding tables, but can pass an additional 80 bits of data from edge node 241-1 to edge node 241-2. In another embodiment, a predetermined number of top bits and a predetermined number of bottom bits can be masked, while a central portion of bits is not masked.

One example use of free address space bits is for transmitting User-Network Interface (UNI) IDs or other customer network information. Note that in FIG. 2, edge node 241-1 connects with multiple UNIs 205 from customer network 225-1. In some situations, it is important to know which interface (which UNI) a given packet is received from at the backbone edge bridge 241-1. One way to do this is for the edge node to create a separate address for each distinct UNI, but this approach increases the number of addresses that would be kept in forwarding tables because additional provider devices can identify the UNI addresses and have to add these UNI addresses to their respective forwarding tables. In one embodiment the system does not treat these UNIs as separate addresses, but instead adds a representative value in the masked portion of the BMAC address field. While the edge nodes need to manage identifications of each UNI, if such identifications were passed as fully qualified addresses, forwarding table of core nodes would fill-up. With freed up bits, the system can copy a UNI-ID into a masked portion of the BMAC address. The intermediate provider devices are not concerned about the UNI-ID, but when the packet arrives containing the UNI-ID number as masked data within the BMAC address field, the receiving edge node can then extract that UNI ID information for forwarding purposes. This keeps forwarding tables small while being able to pass UNI information across the provider network. By treating some bits as opaque and assigning a meaning to them, the system can transparently transfer this information across the provider network, and the meaning and interpretation can be completely dependent on the edge node devices instead of the core node provider devices.

In another embodiment, the edge nodes or core nodes (provider devices) can use the masked UNI-information for path selections. For example provider nodes do not use the UNI-ID information (in the BMAC address space) for table lookups, but instead use this information for hashing operations. Such a technique can enable ECMP or path functionality within the PBB network without blowing-up the size of the forwarding tables or requiring a separate protocol. In another example, a maximum number of bits can be freed up across the address spaces of the BMAC headers, to convert the PBB network to a single switch network fabric architecture to control egress interfaces.

By way of a non-limiting example, packet 207 entering on UNI 205-3 at edge node 241-1 needs to eventually be forwarded to UNI 205-4 at edge node 241-2. In a conventional system, a packet forwarded from edge node 241-1 to edge node 241-2 might do a deep inspection of the packet to identify the destination UNI. With techniques disclosed herein, however, the UNI destination address can be masked within the Mac-in-Mac header so that no deep packet inspection is necessary at edge node 241-2. This is the idea of doing a masked UNI-ID. This technique can be used both in the forwarding and in the learning process. For example, edge node 241-2 can learn packets associated with edge node 241-1 and UNI 205-3. In another embodiment, the user network interfaces can also be identified locally, thereby minimizing the number of bits needed in the address space to accurately identify user network interfaces attached to each backbone edge bridge.

Equal-cost multi-path routing (ECMP) or flow IDs have an objective to create a single flow path from one end user to another end user so that certain data flows are not broken. Without designating a flow path, a provider network has multiple potential data paths that can be selected based on load-balancing or other criteria. Certain data transmissions, however, should be sent along a single flow path. When certain flows are broken across multiple paths the packets that are part of the flow can arrive at different times. For example, the receiving device may receive the fifth packet sent before receiving the third packet sent. When this happens, the receiving end user device may drop those packets and request retransmission, which then degrades the performance of the network. Flows and flow IDs have an objective that if it is possible to indicate to a network what constitutes a flow, then that flow should not be broken across multiple paths, this flow should be executed without requiring deep inspection within a given packet (that is, inspecting header information within the encapsulation header). ECMP can be important because as a given network grows linearly, the potential flow paths can increase exponentially. Because of this, computing paths in advance is computationally not practical or not possible. ECMP enables using all paths in the network while keeping a computational load very small. ECMP is especially beneficial in data centers or networks having lots of links and nodes, or servers that provide a multiplicity of end user sessions.

In conventional ECMP techniques, provider devices inspect underlying header fields such as identifying IP source address, IP destination address, transmission control protocol, User Datagram Protocol (UDP), and other fields, and then do hashing operations on these fields to ensure that all packets having the same IP source, IP destination, and UDP information go along the exact same path. The hashing operation converts the unique IP header information into a small number that is used for path selection or flow path identification.

Thus for provider devices to execute ECMP, each provider device must understand underlying protocols, understand how to decode a given packet, and be able to select the correct numbers as computational input to create a flow path ID. Such a technique is not desirable within the provider network. If every node within a provider network is required to do such deep or complex processing, such processing is going to slow down the network. Additionally, as a given underlying protocol changes, and a provider device does not know how to correctly process the new protocol, then flow IDs may be incorrectly selected. Conventional techniques to address this issue attempt to create a new address space within an encapsulation header that identifies a particular flow ID so that only the backbone edge bridge needs to understand all the different protocols, and the provider devices within the provider network can be considered dumb devices. In other words, conventional techniques attempt to create a new header entry that explicitly identifies a flow ID. Adding an explicit flow ID can help when underlying packets contain encrypted information that provider devices may not know how to read to generate a flow ID, but increases packet overhead.

Techniques disclosed herein, however, can support deterministic flow paths without any need to add an explicit flow ID as an extra or new field of an encapsulation header. Instead, techniques disclosed herein carry a flow ID as a portion of an existing address field within an encapsulation header. This prevents an expansion in packet size, and also prevents forwarding tables from ballooning. This keeps the processing simpler and more extensible for future use. The provider device then needs only to do a hash on the address field or only a masked portion of the address field. This technique effectively eliminates the need to carry an additional header field.

In one processing stage, the provider edge device 241-1 generates a flow ID and inserts this flow ID into an address space of the encapsulation header. In a second processing stage, the provider edge device 241-1 executes a hash on the flow ID masked within the address space to select a given flow path. Subsequent provider core devices 244 would then execute the same hash function to select a next hop. With the flow ID being the same within the address header, subsequent nodes within the provider network 227 can consistently compute the same respective hash results for selecting a single flow path, such as flow path 217. The hash can be executed on the entire address space or simply on the flow ID masked portion within the address space. By inserting a flow ID within the address space of the encapsulation header, packets do not grow in size nor do forwarding tables grow in size.

Masked bits within an address space can also be used to provide time to live (TTL) the functionality. Time to live functionality is beneficial if there is a control plane that is not functioning properly or to prevent loops that allow packets to circulate endlessly. Conventionally, TTL fields are located within the encapsulation and within user fields, that are deeper within a packet. Typically, provider devices do not look at user fields. Conventional techniques suggest adding an additional field within the encapsulation header to provide time to live data, but this suggestion increases header size and requires sweeping upgrades. Either the address field, or the BVLAN-ID field can be used to mask TTL data to provide this functionality without requiring deep packet inspection.

In another embodiment, the BVLAN-ID field can be used to identify the masked portions within the source and destination address fields. In other words, the 12-bit BVLAN-ID field can be used to indicate the usage of the free bits in the address fields, that is, bits within the BVLAN-ID field can be used to indicate which bits are masked and which are not, that is, the structure of the modified address spaces. Each different value of BVLAN-ID can represent a separate format for the actual format used. 12 bits of BVLAN-ID available allow for up to 4096 different ways of formatting BMAC address spaces. Otherwise, each provider node can be configured to know which bits are address bits and which are free/masked bits. Using the BVLAN-ID field to indicate masked bits can be a more extensible option because each packet sent in the PBB network indicates actual usage of free bits.

Figure 9:
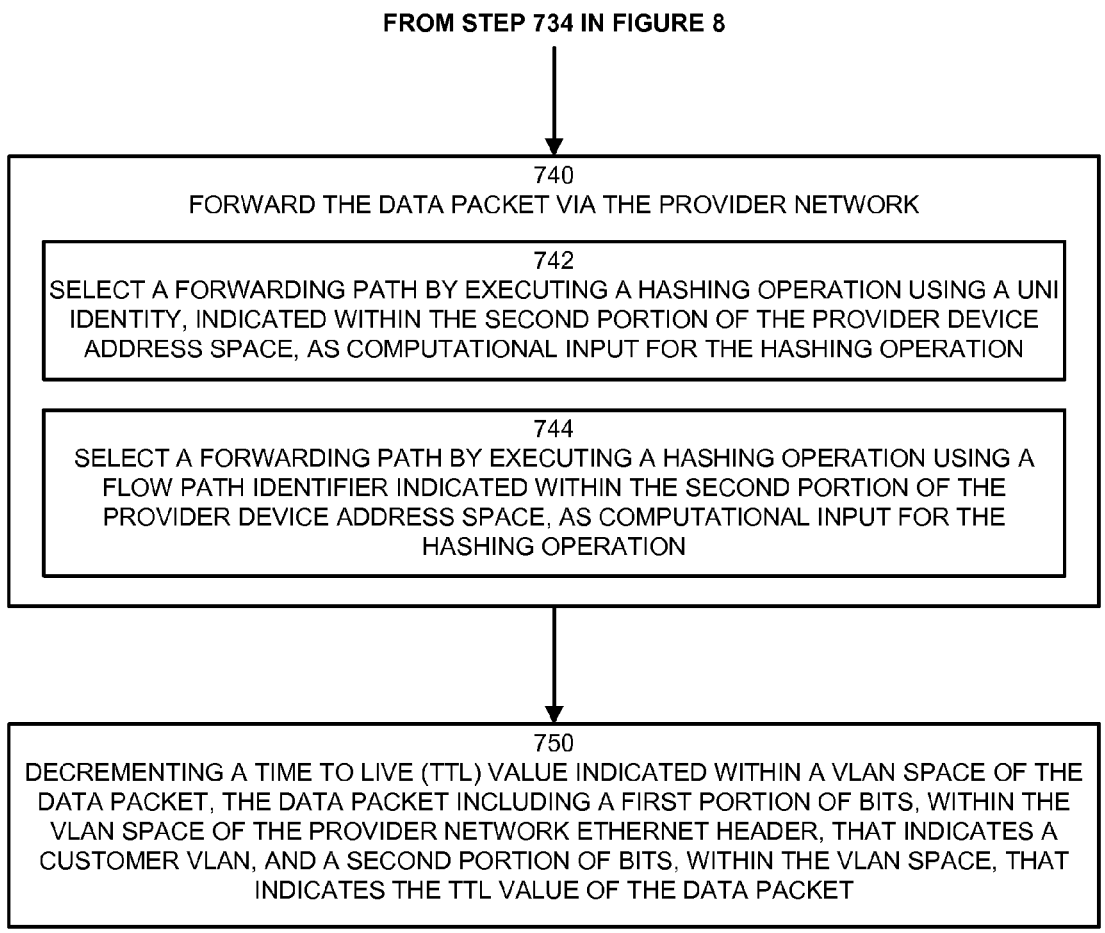
Figure 10:
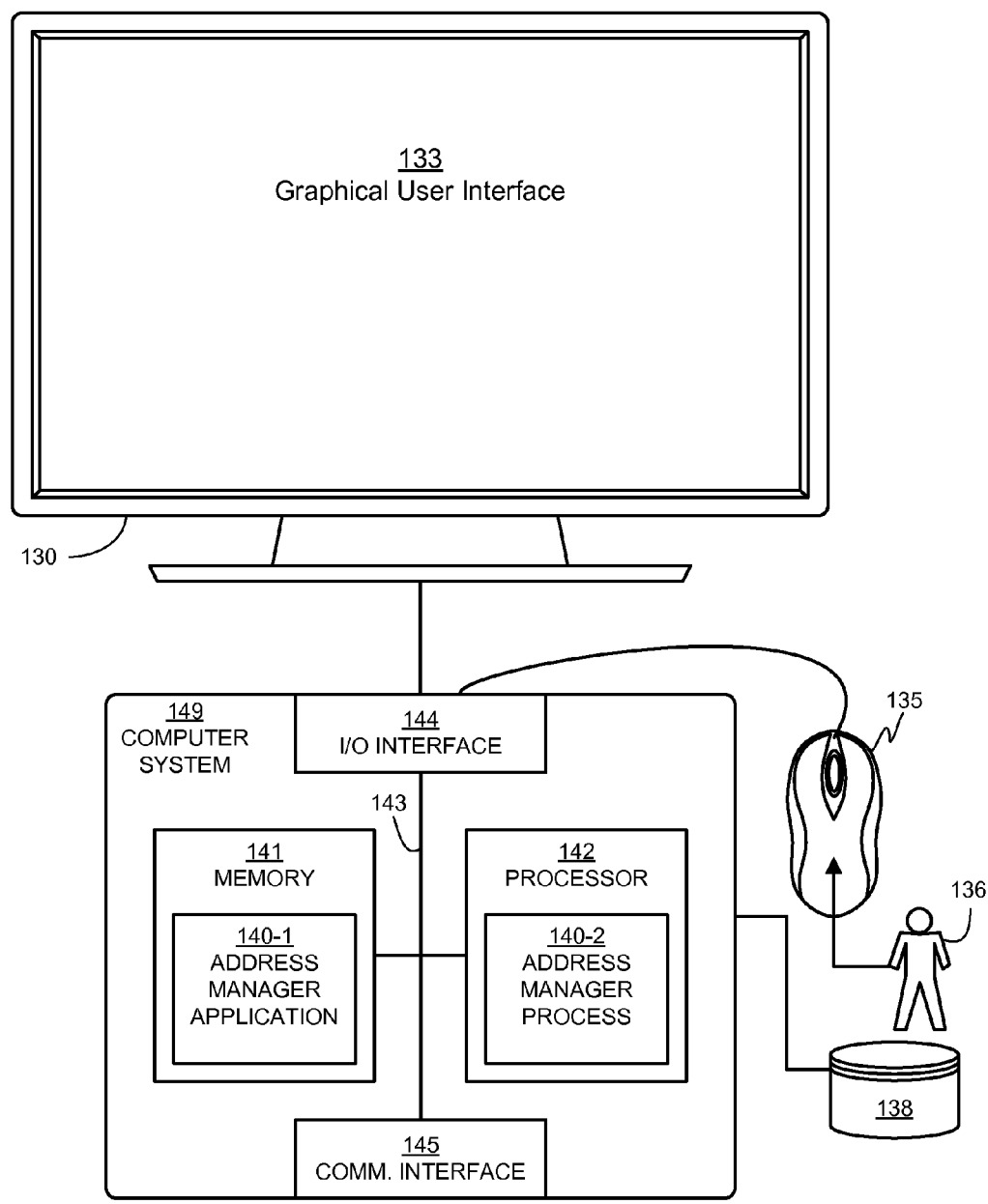
FIG. 10 is an example block diagram of an address manager operating in a computer/network environment according to embodiments herein.

FIG. 10 illustrates an example block diagram of an address manager 140 operating in a computer/network environment according to embodiments herein. Functionality associated with address manager 140 will now be discussed via flowcharts and diagrams in FIG. 4 through FIG. 9. For purposes of the following discussion, the address manager 140 or other appropriate entity performs steps in the flowcharts.

Figure 4:
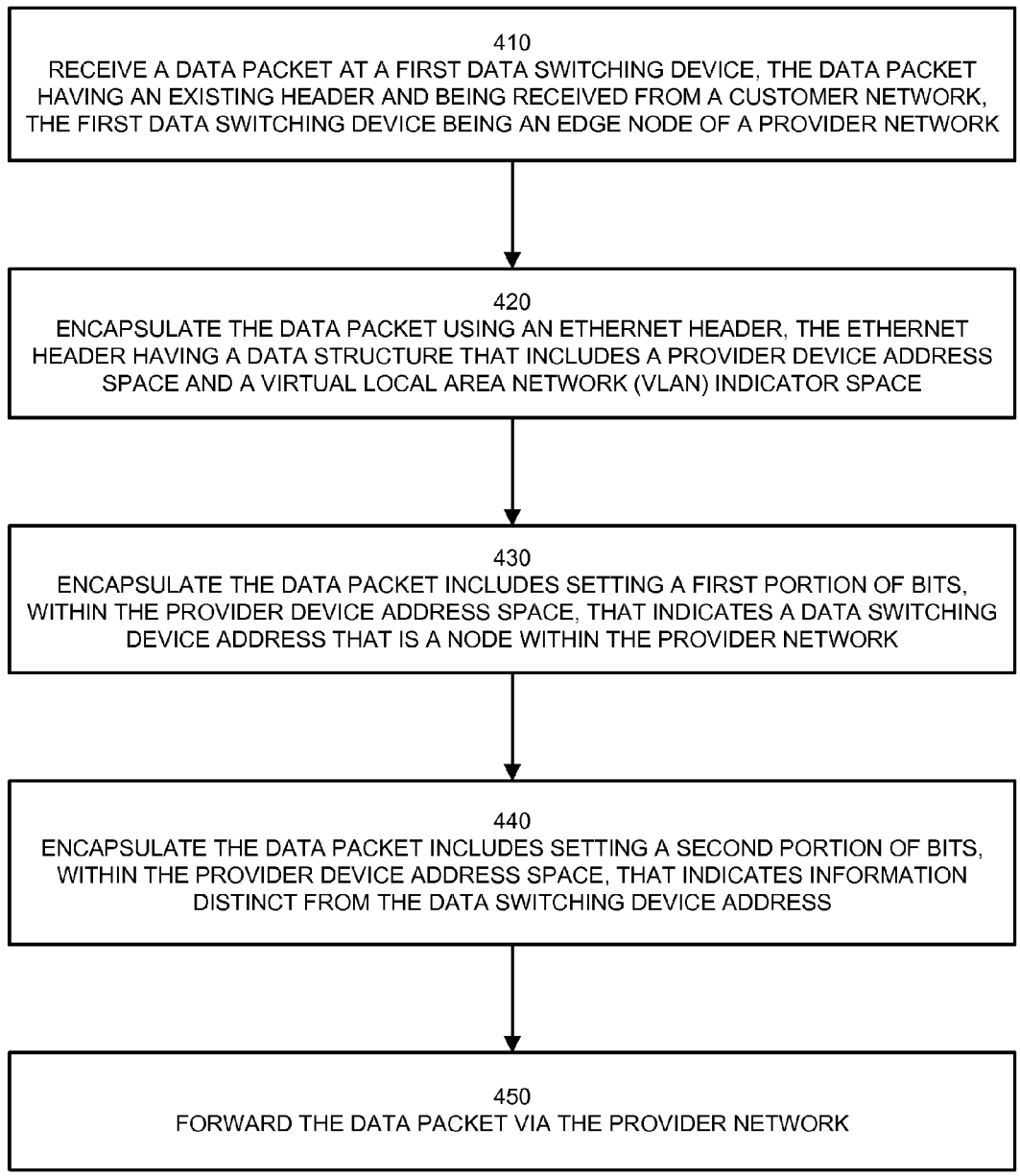
FIGS. 4-6 are flowcharts illustrating an example of a process supporting Ethernet address masking according to embodiments herein.

Now describing embodiments more specifically, FIG. 4 is a flow chart illustrating embodiments disclosed herein. In step 410, address manager 140 receives a data packet at a first data switching device. The data packet has an existing header and is received from a customer network. The first data switching device is an edge node of a provider network, such as node 241-1 of provider network 227.

In step 420, the address manager 140 encapsulates the data packet using an Ethernet header. The Ethernet header has a data structure that includes a provider device address space and a Virtual Local Area Network (VLAN) indicator space. For example, the address manager 140 can use Mac-In-Mac encapsulation. The Ethernet header encapsulates a data packet already having an existing header.

In step 430, encapsulating the data packet includes setting a first portion of bits, within the provider device address space, to indicate a data switching device address that is a node within the provider network. In other words, data is inserted within the provider device address space to indicate a data switching device, such as a router or switch.

In step 440, encapsulating the data packet includes setting a second portion of bits, within the provider device address space, to indicate information distinct from the data switching device address. Thus, the address manager 140 adds data to the address space that is not used to indicate the local address of PBB network devices.

In step 450, the data switching device forwards the data packet via the provider network.

Figure 5:
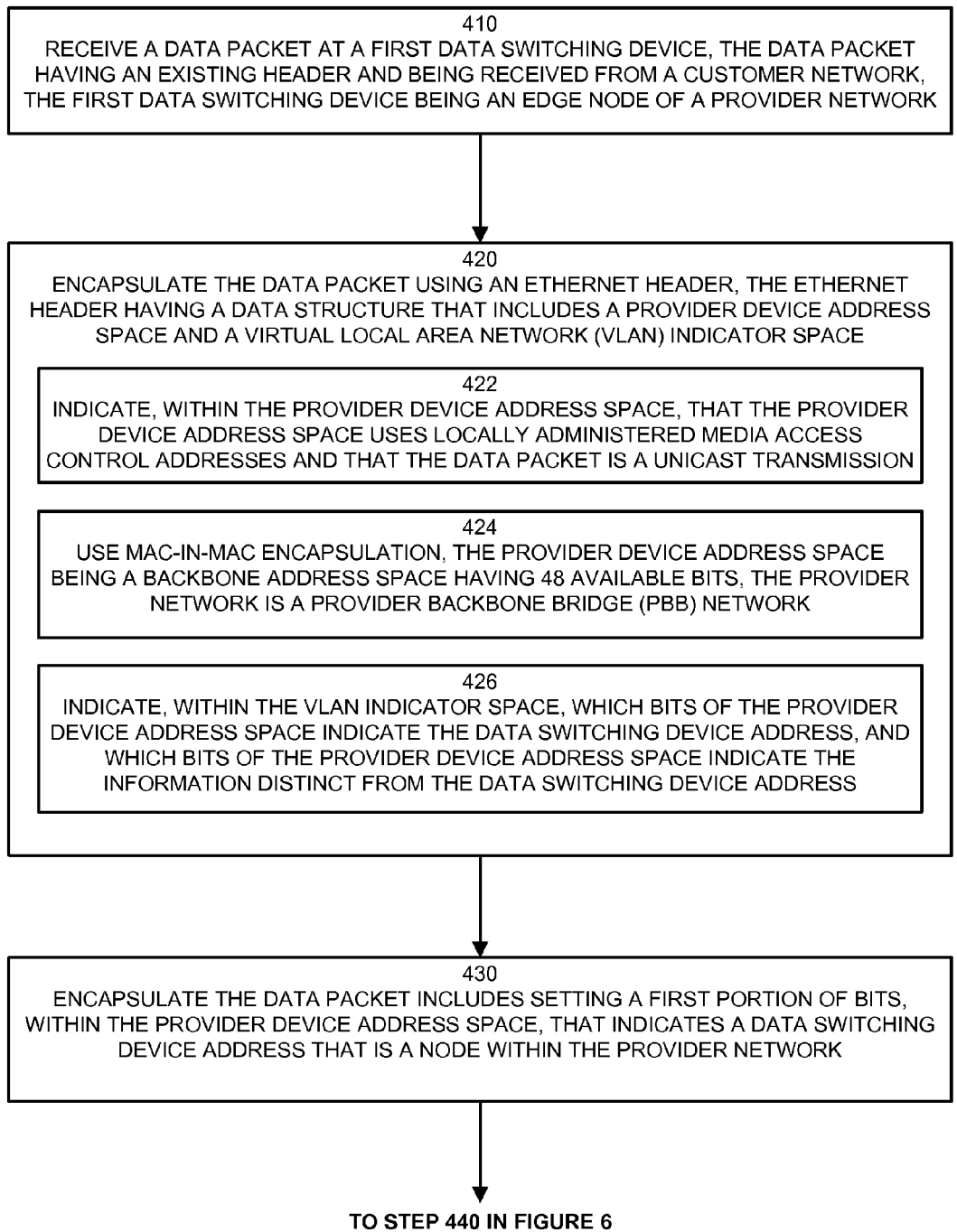
Figure 6:
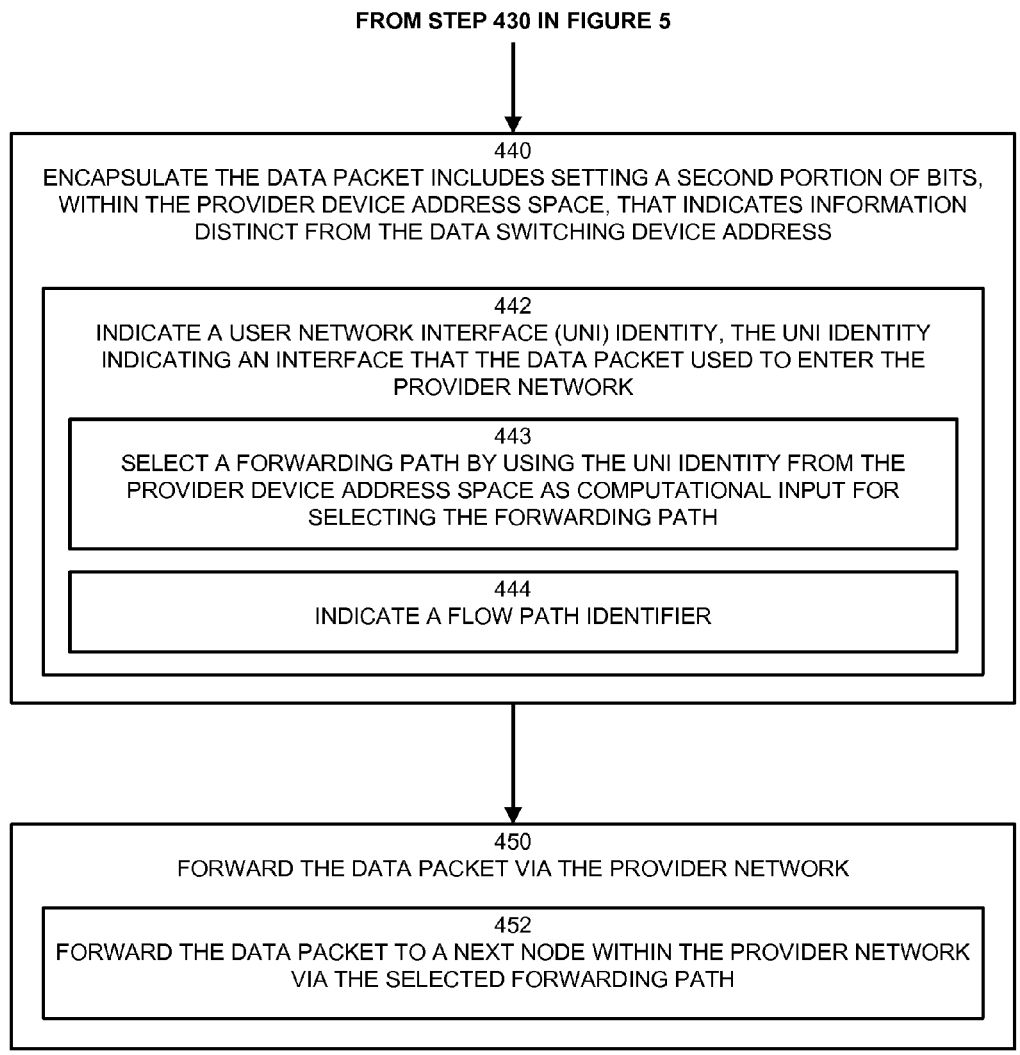

FIGS. 5-6 include a flow chart illustrating additional and/or alternative embodiments and optional functionality of the address manager 140 as disclosed herein.

In step 410, address manager 140 receives a data packet at a first data switching device. The data packet has an existing header and is received from a customer network. The first data switching device is an edge node of a provider network.

In step 420, the address manager 140 encapsulates the data packet using an Ethernet header. The Ethernet header has a data structure that includes a provider device address space and a Virtual Local Area Network (VLAN) indicator space.

In step 422, the address manager 140 indicates, within the provider device address space, that the provider device address space uses locally administered media access control addresses and that the data packet is a unicast transmission. For example, the address manager 140 can set a specific bit within the BMAC address space to indicate that local MAC addresses are being used.

In step 424, the address manager 140 uses Mac-In-Mac encapsulation. The provider device address space is a backbone address space having 48 available bits, and the provider network is a Provider Backbone Bridge (PBB) network In step 426, the address manager 140 indicates, within the VLAN indicator space, which bits of the provider device address space indicate the data switching device address, and which bits of the provider device address space indicate the information distinct from the data switching device address. In other words, the information within the BVLAN-ID itself of a given packet indicates which bits in the address spaces are free bits.

In step 430, encapsulating the data packet includes setting a first portion of bits, within the provider device address space, to indicate a data switching device address that is a node within the provider network.

In step 440, encapsulating the data packet includes setting a second portion of bits, within the provider device address space, to indicate information distinct from the data switching device address.

In step 442, the address manager 140 indicates a User Network Interface (UNI) identity. The UNI identity indicates an interface that the data packet used to enter the provider network. For example, the address manager 140 can indicate that packet 207-1 entered the provider network from UNI 205-3. Note that UNI identities can be locally administered identities.

In step 443, the data switching device selects a forwarding path by using the UNI identity from the provider device address space as computational input for selecting the forwarding path. For example, each provider node can use the UNI ID as input for a hashing operation.

In step 444, the address manager 140 indicates a flow path identifier. The flow path identifier can also be used as computational input for selecting a flow path.

In step 450, the data switching device forwards the data packet via the provider network.

In step 452, the data switching device forwards the data packet to a next node within the provider network via the selected forwarding path.

Encapsulating the data packet can includes setting a first portion of bits, within the VLAN space to indicate a customer VLAN, and setting a second portion of bits, within the VLAN space, to indicate a time to live (TTL) of the data packet. While TTL data can be included within the address space, sometimes it is desirable to keep data within the address space (masked and non-masked data) as unchanging data throughout the provider network.

The Ethernet header can include a Backbone Media Access Control (MAC) destination address, and a Backbone Media Access Control source address. Encapsulating the data packet can include using bits from the Backbone MAC destination address and the Backbone MAC source address to indicate information distinct from the data switching device addresses. Encapsulating the data packets can also include using bits across both the Backbone MAC destination address and the Backbone MAC source address to provide a single switch fabric architecture within a PBB network or for additional functional that requires a greater number of aggregate bits.

Figure 7:
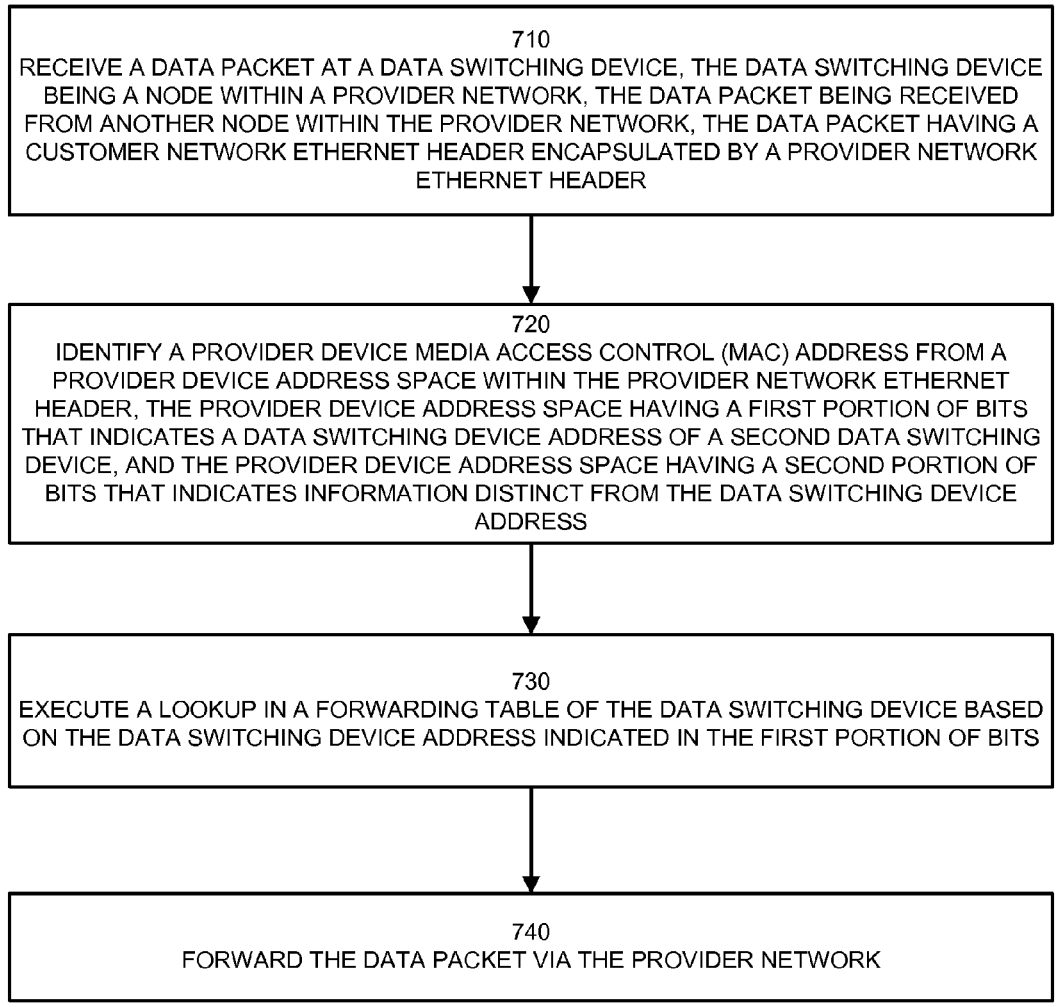
FIGS. 7-9 are flowcharts illustrating an example of a process supporting Ethernet address masking according to embodiments herein.

FIG. 7 is a flow chart illustrating embodiments disclosed herein. In step 710, the address manager receives a data packet at a data switching device. The data switching device is a node within a provider network. The data packet is received from another node within the provider network. The data packet has a customer network Ethernet header encapsulated by a provider network Ethernet header. For example, provider network core node 244-1 receives data packet 207-1.

In step 720, address manager 140 identifies a provider device Media Access Control (MAC) address from a provider device address space within the provider network Ethernet header. The provider device address space has a first portion of bits that indicates a data switching device address of a second data switching device, and the provider device address space has a second portion of bits that indicates information distinct from the data switching device address. For example, provider core node 244-1 receives data packet 207-1 having Mac-In-Mac encapsulation with a portion of BMAC address bits being free or masked bits.

In step 730, the data switching device executes a lookup in a forwarding table of the data switching device based on the data switching device address indicated in the first portion of bits, that is, the unmasked portion of the address space.

In step 740, the data switching device forwards the data packet via the provider network 227.

Figure 8:
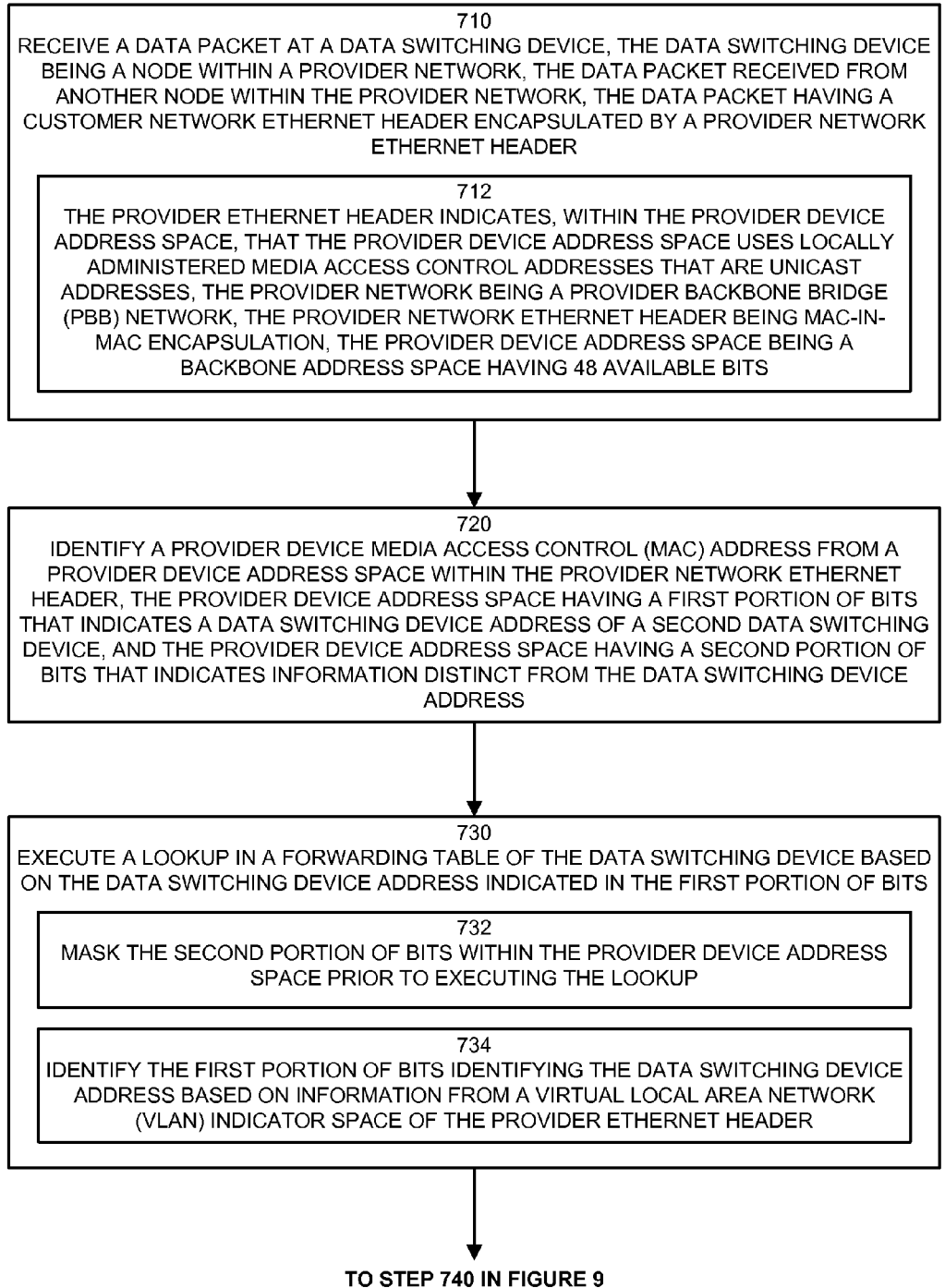

FIGS. 8-9 include a flow chart illustrating additional and/or alternative embodiments and optional functionality of the address manager 140 as disclosed herein. In step 710, the address manager receives a data packet at a data switching device. The data switching device is a node within a provider network. The data packet is received from another node within the provider network. The data packet has a customer network Ethernet header encapsulated by a provider network Ethernet header.

In step 712, the provider Ethernet header indicates, within the provider device address space, that the provider device address space uses locally administered Media Access Control addresses that are unicast addresses. The provider network being a Provider Backbone Bridge (PBB) network, the provider network Ethernet header being Mac-In-Mac encapsulation, and the provider device address space being a backbone address space having 48 available bits.

In step 720, address manager 140 identifies a provider device Media Access Control (MAC) address from a provider device address space within the provider network Ethernet header. The provider device address space has a first portion of bits that indicates a data switching device address of a second data switching device, and the provider device address space has a second portion of bits that indicates information distinct from the data switching device address.

In step 730, the data switching device executes a lookup in a forwarding table of the data switching device based on the data switching device address indicated in the first portion of bits.

In step 732, the data switching device masks the second portion of bits within the provider device address space prior to executing the lookup.

In step 734, the address manager 140 identifies the first portion of bits identifying the data switching device address based on information from a Virtual Local Area Network (VLAN) indicator space of the provider Ethernet header.

In step 740, the data switching device forwards the data packet via the provider network 227.

In step 742, the data switching device selects a forwarding path by executing a hashing operation using a UNI identity, indicated within the second portion of the provider device address space, as computational input for the hashing operation.

In step 744, the data switching device selects a forwarding path by executing a hashing operation using a flow path identifier indicated within the second portion of the provider device address space, as computational input for the hashing operation.

In step 750, the address manager 140 decrements a time to live (TTL) value indicated within a VLAN space of the data packet. The data packet includes a first portion of bits, within the VLAN space of the provider network Ethernet header, that indicates a customer VLAN. The data packet also includes a second portion of bits, within the VLAN space, that indicates the TTL value of the data packet.

As noted above, techniques disclosed herein can be used to support Equal-cost multi-path routing (ECMP) or flow IDs. In data networks when forwarding packets from one point in the network to another, there are often multiple equal cost paths that are available for forwarding the packet on. It is often desirable to be able to exercise all possible paths in the network because such use keeps the network traffic from getting concentrated on any single link, and provides better use of available bandwidth. Devices supporting ECMP need to ensure that the network and devices do not split any given user flow. Splitting a user flow can cause packets to arrive out of order at the destination, which most often results in a severe degradation of network performance and end user experience.

It is also desirable to be able to use Operations, Administration, and Management (OAM) packets to exercise the same exact path as that taken by data packets belonging to users of the network. This is done for network troubleshooting. In general, the only information that OAM frames and user data packets have in common in the network are the Network layer addresses. Otherwise user and OAM frames use different protocols. There are different fields in the packet that can be used to identify user flows with varying degrees of granularity. Some examples of such packet fields include Source MAC, Destination MAC, Source IP, Destination IP, Source TCP/UDP port, Destination TCP/UDP port, etc. The more granularity with which user flows can be identified in the network, the more effective ECMP mechanisms would be in distributing the traffic among all possible paths on which they can be forwarded. Architecturally there are two high level models for supporting ECMP within a network: Algorithmic Head End Directed ECMP, and Hop-by-Hop ECMP.

Conventionally, with Algorithmic Head End Directed ECMP, the ingress node of the network pre-computes all available paths in the network from itself to any other node, and assigns a path identifier to each such path. When forwarding a packet between nodes, the path identifier is added to the packet header using rules that ensure that all packets within any single user flow use the exact sane path identifier. The forwarding tables on all the nodes of the network include information on which outgoing interfaces to use for each individual path identifier. All intermediate devices between nodes simply use the path identifier when deciding which outgoing interface to use to forward the packet. Such an approach simplifies processing on intermediate devices which do not need to look beyond the packet header to identify user flows and so do not have to be upgraded as new protocols as introduced, and enables OAM mechanisms to be effective since OAM frames can carry path identifiers. There are several disadvantages, however, to this approach. For example, in networks with lots of links, the number of paths in the network grows exponentially as the number of links in the network grows linearly. This causes an exponential growth in the size of forwarding tables to support all expected path identifiers. It puts a substantial burden on the CPU and the routing protocol implementations because the number of paths that need to be pre-computed is exponentially larger. Additionally, supporting large numbers of path identifiers could require additional fields to be added to the packet, resulting in increased overhead. Thus, such an approach is very impractical to support ECMP in large networks using this mechanism.

Another conventional mechanism is hop-by-hop ECMP hashing at every Hop. Each given ingress node pre-computes all possible next-hop choices from itself to any other directly attached node in the network. This is different from pre-computing all possible end-to-end paths between two given nodes. Each ingress node and every other node that processes the packet on its way between two nodes execute a same path selection process. Each node generates a hash index using different fields in the packet that can be used to identify user flows. Note that this should take into account the fact that multiple protocols may be represented in user packets. Each node then uses the generated hash index to select one of the possible next-hops that can be used to reach a subsequent node. Since end-to-end paths are not represented in the forwarding table, the size of the forwarding tables does not grow exponentially as the network grows in size. Instead, growth is linear with respect to the number of devices in the network. Also it is computationally easy on the CPU and routing algorithms since only next-hop choices need to be computed and not all possible end-to-end paths. This computation is linear to the number of links in the network, and not exponential. Hop-by-hop ECMP hashing, however, requires every device in the network to hash on user fields of each packet. This makes it difficult to handle the addition of new protocols. Also, some protocols use encryption to scramble packet payload, which encryption a transport device cannot be expected to decode. Also, OAM packets cannot be used to troubleshoot paths taken by user data traffic in this network. This is because OAM frames typically use a protocol different from user data packets. Generally, the only thing that OAM frames have in common with user data packets is the network layer address information, but source and destination address do not provide sufficient granularity to be able to take advantage of all available paths in the network between given nodes. Thus, practical implementations are possible but they suffer from the disadvantages mentioned above.

Another conventional mechanism is hop-by-hop ECMP using explicit Flow IDs. The system herein modifies the hop-by hop ECMP scheme defined above by explicitly adding a Flow-ID field is added to packet headers. For example, added immediately after the network layer address. Flow-IDs are a standard way of encoding the possible, user flow information in the packet into a value that can be carried at a well known location in the packet and considered to be part of the network layer information of the packet. The ingress (or first) device in the packet assigns a Flow-ID to the packet based on a computation of the various fields of the packet. This assignment could also be policy based. The ingress node and all subsequent nodes that process the packet make their selection of the next-hop interface based on the value of the Flow-ID. While this is extensible to new protocols and preserves OAM capabilities, such a mechanism increases packet overhead since the Flow-ID is an additional field in the packet, and network devices have to deal with two different packet formats—those with Flow-ID and those without a Flow-ID in the network layer header.

Techniques disclosed herein use BMAC address masking to support ECMP functionality. As disclosed above, a portion of an address space is used for a device address, while a second portion (masked or free portion) is used for Flow-IDs. An ingress (edge) node assigns a Flow-ID to every packet it sends into the PBB network. The Flow-ID is then copied into the address space. This can be copied into both the BMAC-SA and BMAC-DA. Once the FLOW-ID is copied into the BMAC address, all PBB network devices that process the packet do a hash of the BMAC-SA and the BMAC-DA to select an outgoing interface from among one of the possible next-hop choices. Alternatively, each node does a hash of the masked Flow-ID field only in the BMAC-SA and BMAC-DA. When the address fields contain additional information, such as UNI-IDs, TTL data, or other data, so that there are three or more segments of data in an address field, then each node can do a hash on any combination of the fields for possible next-hop choices.

Techniques disclosed herein also support Reverse Path Forwarding Check (RPFC) (also known as ingress checking) for loop prevention. Conventional SPB standards have adopted RPFC and the mechanism to prevent/mitigate loops in an SPB network. In practice, for every unicast packet received in the SPB network, a (BVLAN-ID,BMAC-SA) lookup is performed. If the BMAC-SA lookup fails (unknown unicast BMAC-SA), then the packet is discarded. A successful BMAC-SA lookup gives the "expected SPB interface" an which packets with that BMAC-SA are expected to arrive on. If the expected interface is not exactly the same as the actual interface on which the packet actually arrived, then the packet is discarded. For every multicast packet received in the SPB network, (BVLAN-ID,BMAC-DA) lookup is performed. If the BMAC-DA lookup failed (unknown multicast BMAC-DA), then the packet is discarded. Since for SPB multicast, the source is encoded in the BMAC-DA, a successful BMAC-DA lookup gives the expected SPB interface on which packets with that BMAC-DA are expected to arrive on. If the expected interface is not exactly the same as the actual interface on which the packet actually arrives, then the packet is discarded.

If ECMP is in use, then packets from a given source node in the SPB network can be expected to be received on more than one possible SPB interface. On any given device (node) in the SPB network, the control plane (ISIS SPB) can compute all the interfaces on which packets from any other device can be received. The unicast RPFC check can be modified when the expected interface is more like a list of interfaces. Thus, RPFC for a given (BVLAN-ID, BMAC-SA) checks if the incoming interface matches any of the list of interfaces on which it is expected to be received on. Note that multicast traffic cannot use ECMP.

Techniques disclosed herein also support loop suppression using TTL. In general, RPFC is an effective mechanism of preventing and mitigating loops. Sometimes, however, it may be desirable to have another protection in the data path for loop suppression. A Time To Live (TTL) field can be used for that purpose. While TTL does not prevent a loop from being formed, TTL can stop a loop from continuing perpetually. TTL can be useful for cases where the control plane is non-responsive or has suffered a fault. Techniques can include a combination of RPFC and TTL. RPFC can be used to prevent loops from forming (or quickly mitigating if formed), while TTL prevents loops from persisting in the case of a fatal control plane fault.

A current PBB Header (Mac-In-Mac encapsulation header as shown in FIG. 1) can be modified for combined RPFC and TTL functionality. In header 120, fields 125, 127, and 129 are considered the BTAG fields. This BTAG can be swapped with a new tag called the ECMP TAG or ETAG. Field 125 becomes "ECMP Ethertype" (16 bits), while field 129 is segmented with 6 bits reserved (of the 12 available bits) and 6 bits used for TTL data. The size of the TTL and Reserved fields can be changed as long as the two of them together do not take up more than 12 bits. To keep the size of the PBB header from increasing to support the ETAG, the existing BTAG in the PBB header can be replaced with the ETAG. Since both of them are 4 bytes long, it does not result in any net increase in the packet overhead. BMAC-DA and BMAC-SA fields can used masked address formats in conjunction with the ETAG.

Thus, in one embodiment, the address manager uses BMAC masking to free some bits in the BMAC-SA and/or BMAC-DA address spaces. All or a portion of the free bits are set aside for carrying a Flow-ID. The sender BEB performs a hash of the different packet fields and generates a value large enough for a hash index to use all the bits set aside or designated for use as a Flow-ID in the BMAC-SA and/or BMAC-DA address spaces. The address manager then sets the Flow-ID bits in the Mac-In-Mac header using the hash index generated above. The sender BEB and all other BCBs that process the packet on its way to the receiver BEB execute respective ECMP path selection using the Flow-ID that is carried in the Mac-In-Mac address header(s) as part of the BMAC-SA and/or BMAC-DA address spaces. Accordingly, there is no increase in packet size, CFM/OAM packets can effectively troubleshoot paths take by real data packets by including the Flow-ID of customer packets, and the use of masked BMAC addresses ensures that forwarding table sizes to not have to be increased.

Continuing with FIG. 10, the following discussion provides a basic embodiment indicating how to carry out functionality associated with the address manager 140 as discussed above. It should be noted, however, that the actual configuration for carrying out the address manager 140 can vary depending on a respective application. For example, computer system 149 can include one or multiple computers that carry out the processing as described herein.

In different embodiments, computer system 149 may be any of various types of devices, including, but not limited to, a network switch, a router, a cell phone, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the address manager 140 of computer system 149 to communicate over a network and, if necessary, retrieve any data required to create views, process content, communicate with a user, etc. according to embodiments herein.

As shown, memory system 141 is encoded with address manager 140-1 that supports functionality as discussed above and as discussed further below. Address manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the address manager 140-1. Execution of the address manager 140-1 produces processing functionality in address manager process 140-2. In other words, the address manager process 140-2 represents one or more portions of the address manager 140 performing within or upon the processor 142 in the computer system 149.

It should be noted that, in addition to the address manager process 140-2 that carries out method operations as discussed herein, other embodiments herein include the address manager 140-1 itself (i.e., the un-executed or non-performing logic instructions and/or data). The address manager 140-1 may be stored on a non-transitory, tangible computer-readable storage medium including computer readable storage media such as floppy disk, hard disk, optical medium, etc.

According to other embodiments, the address manager 140-1 can also be stored in a memory type system such as in firmware, read only memory (ROM), or, as in this example, as executable code within the memory system 141.

In addition to these embodiments, it should also be noted that other embodiments herein include the execution of the address manager 140-1 in processor 142 as the address manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a provider network, the computer-implemented method comprising:
    receiving a data packet at a first data switching device, the data packet having an existing header and being received from a customer network, the first data switching device being an edge node of a provider network;
    encapsulating the data packet using an Ethernet header, the Ethernet header having a data structure that includes a provider device address space and a virtual local area network (VLAN) indicator space;
    encapsulating the data packet includes setting a first portion of bits, within the provider device address space, that indicates a data switching device address that is a node within the provider network;
    encapsulating the data packet includes setting a second portion of bits, within the provider device address space, that indicates information distinct from the data switching device address and indicating, within the VLAN indicator space, which bits of the provider device address space indicate the data switching device address, and which bits of the provider device address space indicate the information distinct from the data switching device address; and
    forwarding the data packet via the provider network.

2. The computer-implemented method of claim 1, wherein encapsulating the data packet using the Ethernet header includes indicating, within the provider device address space, that the provider device address space uses locally administered Media Access Control addresses.

3. The computer-implemented method of claim 2, wherein encapsulating the data packet using the Ethernet header includes indicating, within the provider device address space, that the data packet is a unicast transmission.

4. The computer-implemented method of claim 2, wherein the provider network is a Provider Backbone Bridge (PBB) network, and wherein encapsulating the data packet using the Ethernet header includes using Mac-in-Mac encapsulation, the provider device address space being a backbone address space having 48 available bits.

5. The computer-implemented method of claim 1, wherein setting a second portion of bits that indicates information distinct from the data switching device address includes indicating a User Network Interface (UNI) identity, the UNI identity indicating an interface that the data packet used to enter the provider network.

6. The computer-implemented method of claim 5, further comprising:
  selecting a forwarding path by using the UNI identity from the provider device address space as computational input for selecting the forwarding path; and
  wherein forwarding the data packet via the provider network includes forwarding the data packet to a next node within the provider network via the selected forwarding path.

7. The computer-implemented method of claim 1, wherein setting a second portion of bits that indicates information distinct from the data switching device address includes indicating a flow path identifier.

8. The computer-implemented method of claim 1, further comprising:
  wherein encapsulating the data packet includes setting a first portion of bits, within the VLAN space, that indicates a customer VLAN; and
  wherein encapsulating the data packet includes setting a second portion of bits, within the VLAN space, that indicates a time to live (TTL) of the data packet.

9. The computer-implemented method of claim 1, wherein the Ethernet header includes a Backbone Media Access Control (MAC) destination address, and a Backbone Media Access Control source address;
  wherein encapsulating the data packet includes using bits from the Backbone MAC destination address and the Backbone MAC source address to indicate information distinct from the data switching device addresses.

10. A computer program product including a non-transitory computer-storage medium having instructions stored thereon for processing data information, such that the instructions, when carried out by a processing device, cause the processing device to perform the operations of:
  receiving a data packet at a first data switching device, the data packet having an existing header and being received from a customer network, the first data switching device being an edge node of a provider network;
  encapsulating the data packet using an Ethernet header, the Ethernet header having a data structure that includes a provider device address space and a virtual local area network (VLAN) indicator space;
  encapsulating the data packet includes setting a first portion of bits, within the provider device address space, that indicates a data switching device address that is a node within the provider network;
  encapsulating the data packet includes setting a second portion of bits, within the provider device address space, that indicates information distinct from the data switching device address; and indicating, within the VLAN indicator space, which bits of the provider device address space indicate the data switching device address, and which bits of the provider device address space indicate the information distinct from the data switching device address; and
  forwarding the data packet via the provider network.

11. A computer-implemented method for packet switching in a provider network, the computer-implemented method comprising:
  receiving a data packet at a data switching device, the data switching device being a node within a provider network, the data packet received from another node within the provider network, the data packet having a customer network Ethernet header encapsulated by a provider network Ethernet header;
  identifying a provider device Media Access Control (MAC) address from a provider device address space within the provider network Ethernet header, the provider device address space having a first portion of bits that indicates a data switching device address of a second data switching device, and the provider device address space having a second portion of bits that indicates information distinct from the data switching device address;
  executing a lookup in a forwarding table of the data switching device based on the data switching device address indicated in the first portion of bits and identifying the first portion of bits identifying the data switching device address and the second portion of bits identifying information distinct from the data switching device address based on information from a virtual local area network (VLAN) indicator space of the provide Ethernet header; and
  forwarding the data packet via the provider network.

12. The computer-implemented method of claim 11, wherein executing the lookup includes masking the second portion of bits within the provider device address space prior to executing the lookup.

13. The computer-implemented method of claim 11, wherein the provider Ethernet header indicates, within the provider device address space, that the provider device address space uses locally administered Media Access Control addresses that are unicast addresses.

14. The computer-implemented method of claim 13, wherein the provider network is a Provider Backbone Bridge (PBB) network, the provider network Ethernet header being Mac-in-Mac encapsulation, the provider device address space being a backbone address space having 48 available bits.

15. The computer-implemented method of claim 11, further comprising:
  selecting a forwarding path by executing a hashing operation using a User-Network Interface (UNI) identity, indicated within the second portion of the provider device address space, as computational input for the hashing operation; and
  wherein forwarding the data packet via the provider network includes forwarding the data packet to a next node within the provider network via the selected forwarding path.

16. The computer-implemented method of claim 11, further comprising:
  selecting a forwarding path by executing a hashing operation using a flow path identifier indicated within the second portion of the provider device address space, as computational input for the hashing operation; and
  wherein forwarding the data packet via the provider network includes forwarding the data packet to a next node within the provider network via the selected forwarding path.

17. The computer-implemented method of claim 11, wherein the provider network Ethernet header includes a Backbone Media Access Control (MAC) destination address, and a Backbone Media Access Control source address, the provider network Ethernet header using bits across both the Backbone MAC destination address and the Backbone MAC source address to indicate information distinct from the data switching device addresses.

18. The computer-implemented method of claim 11, further comprising:
  wherein the data packet includes a first portion of bits, within a VLAN space of the provider network Ethernet header, that indicates a customer VLAN, and a second portion of bits, within the VLAN space, that indicates a time to live (TTL) of the data packet; and
decrementing a TTL value indicated within the VLAN space.

* * * * *